(12) United States Patent
Colange et al.

(10) Patent No.: US 8,557,034 B2
(45) Date of Patent: Oct. 15, 2013

(54) PROCESS FOR MANUFACTURING ASPHALT

(75) Inventors: Jacques Colange, Petit Couronne (FR); David Strickland, Rowlandsway Wythenshawe (GB)

(73) Assignee: Shell Oil Company, Houston, TX (US)

( * ) Notice: Subject to any disclaimer, the term of this patent is extended or adjusted under 35 U.S.C. 154(b) by 300 days.

(21) Appl. No.: 12/935,765

(22) PCT Filed: Apr. 1, 2009

(86) PCT No.: PCT/EP2009/053897
§ 371 (c)(1),
(2), (4) Date: Nov. 8, 2010

(87) PCT Pub. No.: WO2009/121913
PCT Pub. Date: Oct. 8, 2009

(65) Prior Publication Data
US 2011/0041732 A1 Feb. 24, 2011

(30) Foreign Application Priority Data
Apr. 2, 2008 (EP) .................... 08290323

(51) Int. Cl.
*C08L 95/00* (2006.01)
*C07C 237/06* (2006.01)

(52) U.S. Cl.
USPC ........... 106/284.4; 106/274; 106/284.06; 564/159

(58) Field of Classification Search
USPC ........... 106/274, 284.4, 284.06; 427/138; 564/159
See application file for complete search history.

(56) References Cited

U.S. PATENT DOCUMENTS

| | | | | |
|---|---|---|---|---|
| 3,431,214 | A | 3/1969 | McDonald | 252/189 |
| 3,960,585 | A | 6/1976 | Gaw | 106/274 |
| 4,750,984 | A | 6/1988 | Ott | 208/39 |
| 5,605,946 | A * | 2/1997 | Planche et al. | 524/68 |
| 6,588,974 | B2 | 7/2003 | Hildebrand et al. | 404/31 |
| 8,273,819 | B2 * | 9/2012 | Gauthier et al. | 524/484 |
| 2003/0073761 | A1* | 4/2003 | Butler et al. | 524/59 |
| 2004/0054038 | A1 | 3/2004 | Andriolo | 524/59 |
| 2005/0038147 | A1* | 2/2005 | Andersen | 524/210 |
| 2006/0260508 | A1 | 11/2006 | Bailey | 106/123.11 |
| 2007/0125268 | A1* | 6/2007 | Deme | 106/281.1 |
| 2008/0041276 | A1 | 2/2008 | Riebesehl et al. | 106/660 |
| 2008/0161451 | A1* | 7/2008 | Lommerts et al. | 524/71 |
| 2010/0288165 | A1* | 11/2010 | Deme | 106/274 |
| 2011/0041729 | A1* | 2/2011 | Colange et al. | 106/270 |
| 2011/0290151 | A1* | 12/2011 | Chughtai et al. | 106/274 |
| 2012/0214912 | A1* | 8/2012 | Harders et al. | 106/284.4 |

FOREIGN PATENT DOCUMENTS

| | | | |
|---|---|---|---|
| CN | 1276820 | 9/2000 | ............... B25J 5/00 |
| CN | 1471560 | 1/2004 | ............... C08L 95/00 |
| CN | 1620475 | 5/2005 | ............... C08K 5/20 |
| CN | 1847318 | 10/2006 | ............... C08L 95/00 |
| CN | 1890310 | 1/2007 | ............... C08K 3/00 |
| FR | 1538681 | 9/1968 | |
| GB | 1528384 | 10/1978 | ............... C08L 95/00 |
| JP | 538152 | 2/1993 | |
| WO | WO 00/73378 A1 * | 12/2000 | |
| WO | WO0234835 | 5/2002 | ............... C08L 95/00 |
| WO | WO03014231 | 2/2003 | ............... C09D 1/00 |
| WO | WO03062315 | 7/2003 | ............... C08K 5/20 |
| WO | WO2005059016 | 6/2005 | ............... C08K 3/00 |
| WO | WO2005087869 | 9/2005 | ............... C08L 95/00 |
| WO | WO2006107179 | 10/2006 | |
| WO | WO2007054503 | 5/2007 | ............... C08L 95/00 |

* cited by examiner

Primary Examiner — Helene Klemanski
(74) Attorney, Agent, or Firm — Charles W. Stewart

(57) ABSTRACT

A process for manufacturing asphalt is disclosed. The process comprises the steps of: (i) heating bitumen; (ii) heating aggregate; and (iii) mixing the hot bitumen with the hot aggregate in a mixing unit to form asphalt. From 10 to 200 wt % of sulphur, based upon the weight of the bitumen, is added in at least one of the steps (i), (ii) or (iii) and from 0.1 to 20 wt % of a compound of formula A, based upon the weight of the bitumen, is added in at least one of the steps (i), (ii) or (iii). $R^1$ and $R^2$ are independently chosen from C6-C30 alkyl or alkenyl.

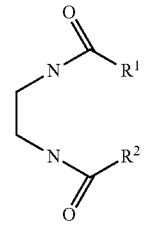

(A)

9 Claims, No Drawings

PROCESS FOR MANUFACTURING ASPHALT

The present application claims priority from European Patent Application 08290323.8 filed 2 Apr. 2008.

FIELD OF THE INVENTION

The invention relates to a process for manufacturing asphalt wherein sulphur is incorporated into the asphalt.

BACKGROUND OF THE INVENTION

In the road construction and road paving industry, it is a well-practised procedure to coat aggregate material such as sand, gravel, crushed stone or mixtures thereof with hot fluid bitumen, spread the coated material as a uniform layer on a road bed or previously built road while it is still hot, and compact the uniform layer by rolling with heavy rollers to form a smooth surfaced road.

The combination of bitumen with aggregate material, such as sand, gravel, crushed stone or mixtures thereof, is referred to as "asphalt". Bitumen, also referred to as "asphalt binder", is usually a liquid binder comprising asphaltenes, resins and oils. Bitumen can for example comprise mixtures derived from petroleum residues such as residual oils or pitch or mixtures thereof.

It is known in the art that sulphur can be mixed with bitumen for applications in the road construction and road paving industry. One of the problems encountered when using sulphur in bitumen is the unwanted formation of hydrogen sulphide, resulting from dehydrogenation reactions between bitumen and sulphur at high temperatures, e.g. greater than 140° C.

In view of the substantial amounts of sulphur used, especially in asphalt having high sulphur-bitumen weight ratios, e.g. as high as 1:1, hydrogen sulphide emission is a serious nuisance. Therefore, it is desirable to reduce the unwanted formation and emission of hydrogen sulphide from sulphur-comprising asphalt.

One method to reduce hydrogen sulphide emission from hot cast sulphur-asphalt mixtures is described in WO 2005/059016. Incorporating a hydrogen sulphide-suppressant such as ferric chloride into sulphur pellets can reduce hydrogen sulphide emissions during the manufacture of sulphur-containing asphalt. However, ferric sulphide can be difficult to handle and is liable to react with moisture in the air, so it is desirable to find alternative means of reducing hydrogen sulphide emission from sulphur-asphalt mixtures.

SUMMARY OF THE INVENTION

The inventors have now discovered that the temperature of manufacture of sulphur-containing asphalt can be lowered if an additional component is added during the manufacture of the asphalt. Lowering the temperature of mixing and/or the temperature of compaction reduces the amount of hydrogen sulphide that is released during the production of the asphalt pavement. Despite the lower mixing and/or compaction temperatures, the resulting asphalt is durable and has low water sensitivity.

Accordingly, the present invention provides a process for manufacturing asphalt, the process comprising the steps of:
(i) heating bitumen;
(ii) heating aggregate;
(iii) mixing the hot bitumen with the hot aggregate in a mixing unit to form asphalt;
wherein from 10 to 200 wt % of sulphur, based upon the weight of the bitumen, is added in at least one of the steps (i), (ii) or (iii),
and wherein from 0.1 to 20 wt % of a compound of formula A,

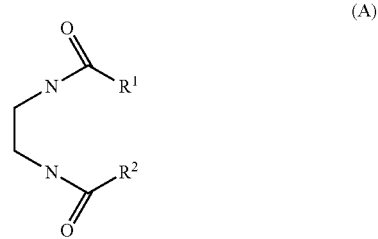

based upon the weight of the bitumen, is added in at least one of the steps (i), (ii) or (iii), wherein $R^1$ and $R^2$ are independently chosen from $C_6$-$C_{30}$ alkyl or alkenyl.

The invention further provides a process for preparing an asphalt pavement, wherein asphalt is prepared by a process according to the invention, and further comprising steps of:
(iv) spreading the asphalt into a layer; and
(v) compacting the layer. The invention further provides asphalt and an asphalt pavement prepared by the processes according to the invention.

In an embodiment of the invention, the sulphur and the compound of formula A are added together; the sulphur is in the form of pellets and the compound of formula A is incorporated in the sulphur pellets. Accordingly the invention further provides sulphur pellets comprising a compound of formula A,

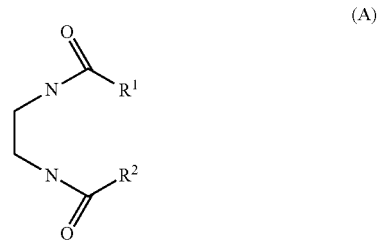

wherein $R^1$ and $R^2$ are independently chosen from $C_6$-$C_{30}$ alkyl or alkenyl. These pellets are advantageously used in a process according to the invention.

DETAILED DESCRIPTION OF THE INVENTION

In step (i) of the process according to the invention bitumen is heated, preferably at a temperature of from 60 to 200° C., preferably from 80 to 150° C., more preferably from 100 to 140° C. The bitumen is preferably a paving grade bitumen suitable for road application having a penetration of, for example, from 9 to 1000 dmm, more preferably of from 15 to 450 dmm (tested at 25° C. according to EN 1426: 1999) and a softening point of from 25 to 100° C., more preferably of from 25 to 50° C. (tested according to EN 1427: 1999).

In step (ii) of the process aggregate is heated, preferably at a temperature of from 60 to 200° C., preferably from 80 to 150° C., more preferably from 100 to 140° C. The aggregate is suitably any aggregate that is suitable for road applications. The aggregate may consist of a mixture of coarse aggregate (retained on a 4 mm sieve), fine aggregate (passes a 4 mm sieve but is retained on a 63 μm sieve) and filler (passes a 63 μm sieve).

In step (iii), the hot bitumen and hot aggregate are mixed in a mixing unit. Suitably, the mixing takes place at a temperature of from 80 to 200° C., preferably from 90 to 150° C., more preferably from 100 to 140° C. Typically, the mixing time is from 10 to 60 seconds, preferably from 20 to 40 seconds.

The temperatures at which the bitumen and aggregate are heated and subsequently mixed are desirably kept as low as possible in order to reduce hydrogen sulphide emissions when the sulphur is added. However, the temperatures need to be sufficiently high such that the bitumen can effectively coat the aggregate. The present inventors have found that incorporating the compound of formula A reduces the temperature at which asphalt of desirable strength and durability can be produced.

The amount of sulphur added to the bitumen, aggregate or bitumen/aggregate mixture is from 10 to 200 wt %, based upon the weight of the bitumen, preferably from 20 wt %, more preferably from 40 wt % and preferably to 100 wt %, more preferably to 80 wt %. The presence of sulphur in the asphalt paving mixture can improve the strength and rutting resistance of the paving mixture and it is important to include sufficient sulphur to realise these advantages. Additionally, incorporating increased amounts of sulphur can decrease the cost of the paving mixture. However, too much sulphur can decrease the workability of the paving mixture so it is important not to use more than 200 wt % of sulphur pellets, preferably not more than 100 wt %.

The sulphur is preferably incorporated in the form of pellets. Reference herein to pellets is to any type of sulphur material that has been cast from the molten state into some kind of regularly sized particle, for example flakes, slates or sphere-shaped sulphur such as prills, granules, nuggets and pastilles or half pea sized sulphur. The sulphur pellets typically comprise from 50 to 99 wt % of sulphur, based upon the weight of the sulphur pellets, preferably from 60 wt % and most preferably from 70 wt %; and typically to 95 wt %, and preferably to 90 wt %. A preferred range is from 60 to 90 wt %.

The sulphur pellets may comprise other components, for example, they may comprise amyl acetate in a concentration of at least about 0.08 wt % based upon the weight of the pellet and/or may comprise carbon at a concentration of at least 0.25 wt %. As described in WO 03/14231, liquid sulphur can be plasticized by the addition of carbon at a concentration of at least 0.25 wt % and can be further treated with amyl acetate at a concentration of at least about 0.08 wt % to produce an even more manageable plasticized sulphur pellet.

The amount of compound of formula A that is added to the bitumen, aggregate or bitumen/aggregate mixture is from 0.1 to 20 wt %, preferably from 0.5 to 20 wt %, more preferably from 1 to 8 wt %, based upon the weight of the bitumen. The compound of formula A is essentially the condensation product of ethylene diamine and one or more fatty acids. $R^1$ and $R^2$ are independently chosen from $C_6$-$C_{30}$ alkyl or alkenyl, but preferably $R^1$ and $R^2$ are the same. Preferably $R^1$ and $R^2$ are $C_{10}$-$C_{20}$ alkyl or alkenyl; more preferably $R^1$ and $R^2$ are $C_{12}$-$C_{18}$ alkyl or alkenyl. Most preferably $R^1$ and $R^2$ are $CH_3(CH_2)_{16}$ such that compound A is ethylene bis stearamide.

Incorporating the compound of formula A into the asphalt mixture reduces the temperature at which the asphalt can be produced. Additionally, the incorporation of compound A reduces the water sensitivity of the resulting asphalt.

The sulphur and the compound of formula A are preferably added together, i.e. both in step (i), step (ii) or step (iii). In a first embodiment, hot aggregate is mixed with the sulphur and the compound of formula A. Hot bitumen is then added to the hot aggregate-sulphur mixture. In a second embodiment, hot aggregate is mixed with hot bitumen, and the sulphur and compound of formula A are added to the hot bitumen-aggregate mixture. This embodiment offers the advantage of producing a stronger sulphur-asphalt mixture strength. In a third embodiment, hot bitumen is mixed with sulphur and the compound of formula A and the resulting hot bitumen-sulphur mixture is mixed with hot aggregate to obtain a sulphur-comprising asphalt mixture.

Alternatively, the sulphur and the compound of formula A may be added separately. For example, the compound of formula A may be added to the bitumen in step (i) and the sulphur may be added in step (iii).

In a preferred embodiment of the invention, the sulphur and the compound of formula A are added together; the sulphur is in the form of pellets and the compound of formula A is incorporated in the sulphur pellets. The sulphur pellets preferably comprise from 0.2 to 30 wt % of the compound of formula A, based upon the weight the sulphur, more preferably from 1 to 12 wt %. The sulphur pellets are suitably prepared by a process wherein liquid sulphur is mixed with the compound of formula A and optionally additional components such as carbon or amyl acetate. The mixture is then shaped and/or pelletised.

In one embodiment of the invention sulphur may be added in the form of two types of sulphur pellets; a first type of sulphur pellet that comprises a compound of formula A and a second type of sulphur pellet that does not comprise a compound of formula A. This has the advantage that the compound of formula A is essentially concentrated in the first type of sulphur pellet and conventional sulphur pellets can be used to make up the rest of the sulphur requirement.

The invention further provides asphalt prepared by a process according to the invention. Typically, the asphalt comprises at least 1 wt % of bitumen, based on the weight of the asphalt. Asphalt comprising from about 1 weight % to about 10 weight % of bitumen is preferred, with a special preference for asphalt comprising from about 3 weight % to about 6 weight % of bitumen based on the weight of the asphalt.

The invention further provides a process for preparing an asphalt pavement, wherein asphalt is prepared by a process according to the invention, and further comprising steps of:
(iv) spreading the asphalt into a layer; and
(v) compacting the layer. The invention further provides an asphalt pavement prepared by the processes according to the invention.

The compaction in step (v) suitably takes place at a temperature of from 80 to 200° C., preferably from 90 to 150° C., more preferably from 100 to 140° C. The temperature of compaction is desirably kept as low as possible in order to reduce hydrogen sulphide emissions. However, the temperature of compaction needs to be sufficiently high such that the voids content of the resulting asphalt is sufficiently low for the asphalt to be durable and water resistant.

The invention will now be described by reference to examples which are not intended to be limiting of the invention.

Comparative Example 1

Asphalt according to the DAC (Dense Asphalt Concrete) 0/11 specification was prepared. Aggregate was heated to 140° C., bitumen was heated to 140° C. and the aggregate and bitumen were mixed at 140° C. The bitumen was a 70/100 penetration grade bitumen and the amount of bitumen was 5.8 wt %, based upon the weight of aggregate. The asphalt was formed into a layer and compacted at a temperature of 130° C.

Comparative Example 2

Asphalt was prepared according to comparative example 1, except that the bitumen was replaced with a mixture of 70/100 penetration grade bitumen and sulphur pellets. (NB: the binder content was adjusted such that the volumetric compositions of the asphalts of comparative example 1 and comparative example 2 are essentially the same; this means that the weight percentage of binder is slightly higher in comparative example 2 than in comparative example 1). The ratio of bitumen:sulphur pellets was 60 wt %:40 wt %, and the sulphur pellets were SEAM™ pellets from Shell, consisting predominantly of sulphur and also comprising carbon black.

Example 1

Asphalt was prepared according to comparative example 2, except that 1.5 wt % of ethylene bis stearamide (EBS), based upon the combined weight of the bitumen and the sulphur pellets was incorporated into the asphalt.

Example 2

Asphalt was prepared according to example 1, except that 3 wt % of ethylene bis stearamide (EBS), based upon the combined weight of the bitumen and the sulphur pellets was incorporated into the asphalt.

Temperature of Mixing and Compaction and Resulting Voids Content

The temperature of the mixing and compaction of the asphalt was varied and the voids content of the resulting asphalt was measured using the EN 12697-6 standard measurement. The results are given in Table 1:

TABLE 1

|  | Temperature of Mixing | Temperature of Compaction | Mean Voids (%) |
| --- | --- | --- | --- |
| Comparative Example 1 | 140 | 130 | 5.4 |
| Comparative Example 2a | 140 | 130 | 6.5 |
| Comparative Example 2b | 130 | 120 | 5.5 |
| Example 1a | 130 | 120 | 4.9 |
| Example 1b | 130 | 120 | 4.9 |
| Comparative Example 2c | 130 | 110 | 7.7 |
| Example 1c | 130 | 110 | 6.1 |
| Example 2a | 130 | 110 | 6.6 |
| Comparative Example 2d | 130 | 100 | 9.1 |
| Example 1d | 130 | 100 | 8.1 |
| Example 2b | 130 | 100 | 7.0 |

The compaction used for all comparative examples and examples was the same. For dense asphalt concrete, the voids content is desirably low, and a higher voids content potentially means that the asphalt will have durability problems. The asphalt of comparative example 1 (which does not contain sulphur) provides an acceptable voids content of 5.4% at mixing and compaction temperatures of 140° and 130° C. The asphalt of comparative example 2a (which comprises a 60:40 wt % ratio of bitumen to sulphur) has a voids content of 6.5% at mixing and compaction temperatures of 140° C. and 130° C. Reducing the temperature of mixing and compaction generally leads to an increase in voids content (compare comparative examples 2a-d and examples 1a-d). However, when 1.5 wt % or 3 wt % of EBS is incorporated into the asphalt, the voids content is generally lower at the reduced temperatures (compare, e.g. comparative example 2d with examples 1d and 2b). This means that by incorporating the BBS, the temperature of mixing and compaction can be lowered without detrimentally affecting the durability of the asphalt.

Temperature of Mixing and Compaction and Resulting Direct Marshall Stability and Retained Marshall Stability After compaction, the asphalt specimens need to build up in strength due to the sulphur crystallisation during 14 days. After 14 days, the Marshall stability for the sulphur-containing asphalt, which is nearly double than that of comparative example 1, was measured according to EN 12697-34 standard. The retained Marshall stability was measured according to the same standard except that some of the specimens were conditioned under vacuum and water (24 mbar absolute pressure, 4° C., during 3 hours) followed by 1 hour at 0° C. and atmospheric pressure then, 48 hours in a water bath at 60° C. The retained stability is given as the percentage of the direct Marshall stability. The results are given in Table 2:

TABLE 2

|  | Temperature of Mixing | Temperature of Compaction | Retained Stability (%) |
| --- | --- | --- | --- |
| Comparative Example 1 | 140 | 130 | 80 |
| Comparative Example 2a | 140 | 130 | 49 |
| Comparative Example 2b | 130 | 120 | 50 |
| Example 1a | 130 | 120 | 72 |
| Example 1b | 130 | 120 | 70 |

The retained stability of the asphalt of comparative example 1 (which does not contain sulphur) is high, whereas the retained stability of the asphalt of comparative example 2a (which comprises a 60:40 wt % ratio of bitumen to sulphur) is significantly lower. However, due to the presence of the EBS, the retained stabilities of examples 1a and 1b are significantly higher than that of comparative examples 2a and 2b, and approach the retained stability of comparative example 1. Incorporation of EBS can reduce the water sensitivity of sulfur-containing asphalt.

What is claimed is:

1. A process for manufacturing asphalt, the process comprising the steps of:
   (i) heating bitumen, thereby providing hot bitumen;
   (ii) heating aggregate, thereby providing hot aggregate;
   (iii) mixing the hot bitumen with the hot aggregate in a mixing unit to form asphalt;
   wherein from 10 to 200 wt % of sulphur, based upon the weight of the bitumen, is added in at least one of the steps (i), (ii) or (iii),
   and wherein from 0.1 to 20 wt % of a compound of formula A,

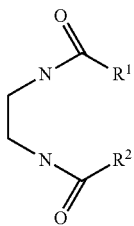

(A)

based upon the weight of the bitumen, is added in at least one of the steps (i), (ii) or (iii), wherein $R^1$ and $R^2$ are independently chosen from $C_6$-$C_{30}$ alkyl or alkenyl, and wherein the sulphur and the compound of formula A are added at the same time, the sulphur is in the form of pellets and the compound of formula A is incorporated in the sulphur pellets.

2. A process according to claim 1, wherein compound A is ethylene bis stearamide.

3. Asphalt prepared by a process according to claim 1.

4. A process for preparing an asphalt pavement, wherein asphalt is prepared by a process according to claim 1, and further comprising steps of:
 (iv) spreading the asphalt into a layer; and
 (v) compacting the layer.

5. An asphalt pavement prepared by a process according to claim 4.

6. Asphalt prepared by a process according to claim 2.

7. A process for preparing an asphalt pavement, wherein asphalt is prepared by a process according to claim 2, and further comprising steps of:
 (iv) spreading the asphalt into a layer; and
 (v) compacting the layer.

8. An asphalt pavement prepared by a process according to claim 7.

9. A sulphur pellet comprising a compound of formula A,

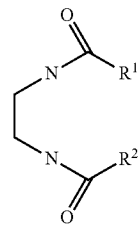

(A)

wherein $R^1$ and $R^2$ are independently chosen from $C_6$-$C_{30}$ alkyl or alkenyl.

* * * * *